United States Patent
Brandl et al.

(10) Patent No.: US 6,374,697 B1
(45) Date of Patent: Apr. 23, 2002

(54) HANDLEBAR FOR A TWO-WHEELED VEHICLE

(75) Inventors: Raimund Brandl, Landau; Martin Silomon, Munich; Stephan Bleicher, Schierling, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/434,281

(22) Filed: Nov. 5, 1999

(30) Foreign Application Priority Data

Nov. 5, 1998 (DE) .......................... 198 51 016

(51) Int. Cl.[7] .............................................. B62K 21/12
(52) U.S. Cl. ...................... 74/551.1; 74/551.8; 29/428
(58) Field of Search ............................ 74/551.1–551.8; 264/328.1; 280/279, 278, 280; 403/59, 83, 87; 428/113, 292.1, 294.1; 29/428

(56) References Cited

U.S. PATENT DOCUMENTS

| | | | |
|---|---|---|---|
| 5,083,476 A | | 1/1992 | Borromeo .................. 74/551.1 |
| 5,117,708 A | * | 6/1992 | Boyer et al. ............... 74/551.1 |
| 5,119,690 A | | 6/1992 | Shu ........................... 74/551.1 |
| 5,146,809 A | | 9/1992 | Ruana |
| 5,199,322 A | * | 4/1993 | Wu ............................ 74/551.1 |
| 5,503,773 A | * | 4/1996 | Pearce et al. ............. 264/328.1 |
| 5,557,982 A | * | 9/1996 | Voss et al. ................. 74/551.1 |
| 5,685,201 A | * | 11/1997 | Renshaw .................... 74/551.2 |
| 5,832,785 A | * | 11/1998 | Costahaude et al. ... 74/551.4 X |
| 6,182,528 B1 | * | 2/2001 | Renshaw .................... 74/551.1 |

FOREIGN PATENT DOCUMENTS

| | | | | |
|---|---|---|---|---|
| DE | 810 584 | | 8/1951 | |
| DE | PS 810 584 | | 8/1951 | |
| DE | 3900330 | * | 7/1990 | ............... 74/551.1 |
| DE | 40 21 034 | | 6/1991 | |
| DE | 3134578 C2 | | 7/1992 | |
| DE | 4323501 A1 | | 1/1995 | |
| DE | 19851015 | * | 5/2000 | ............... 74/551.1 |
| GB | 2321225 A | | 7/1998 | |
| JP | 2000-190889 | * | 7/2000 | ............... 74/551.1 |

OTHER PUBLICATIONS

Literature:RadMarkt, Nr. Jun. 1992, p. 59.
German Search Report, Jul. 13, 1999.

* cited by examiner

*Primary Examiner*—Vinh T. Luong
(74) *Attorney, Agent, or Firm*—Crowell & Moring LLP

(57) ABSTRACT

A handle bar, particularly for a two-wheeler, is made of at least two metal profile parts which overlap one another on at least a partial area of their length and which are fixed to one another. On at least one end of the overlapping area, both metal profile parts are covered by another component such that the end of their overlapping area is surrounded in a permanently elastically sealing manner.

15 Claims, 2 Drawing Sheets

HANDLEBAR FOR A TWO-WHEELED VEHICLE

BACKGROUND AND SUMMARY OF THE INVENTION

The invention relates to a handle bar, particularly for a two-wheeled vehicle, constructed of at least two metal profile parts which overlap one another on at least a partial area of their length and are fixed to one another.

German Patent Document DE 40 21 034 A1 describes a handle bar for bicycles, which may be made of one or several metal profile parts, for example, made of aluminum alloy, according to the conventional technology. Among other parts, it has an essentially straight center part which, in the center, being assigned to a reinforced area, can be fixedly connected with the steering column of the bicycle. In addition, it has two lateral grip ends. Nothing further is disclosed concerning the connection of the reinforced area with the center part of the handle bar.

Handle bars which can appropriately withstand stress may be designed such that a center part has a larger section modulus and a larger cross-section than grip areas at the outer ends of the handle bar. For this purpose, for example, tube-type handle bars which have a large diameter in the center parts are tapered to have smaller diameters at the grip ends. The diameter in the grip area may also be reduced by welding or gluing different tube diameters.

A taper from a larger to a smaller tube diameter is possible only in certain dimensions. When the diameter is reduced, the material is subjected to a high plastic deformation and there is a strain hardening. Subsequent bending processes on the handle bar result in an additional plastic deformation which leads to the danger of a local overstressing of the material. During the welding-together of different tube diameters, the weld seam is a process-dependent risk factor for the life of the handle bar. Also, increased manufacturing expenditures will occur which result in increased costs. The gluing-together of tubes requires additional safety measures for the durability of the handle bar. This also raises the costs.

Furthermore, it was found that, in handle bars which are constructed of at least two mutually fixed metal profile parts which overlap on at least a partial area of their length, for example, moisture can penetrate at the end of the overlapping area of the metal profile parts between these metal profile parts. If the metal profile parts are, for example, two concentric tubes which extend inside one another, a ring-shaped gap is situated in the area of the overlapping of the two tubes, specifically between the tube with the large outside diameter and the tube with the small outside diameter. Through this gap, moisture can penetrate unhindered between the two tubes. As a result, corrosively acting media, such as hydrous moisture with dissolved de-icing salt, can adhere between the two tubes, which results in corrosion of the handle bar in the gap area. This gap corrosion is intensified by the mechanical influence of corrosion products during a relative movement between the exterior and the interior tube during a dynamic stressing of the handle bar.

It is therefore an object of the invention to provide a handle bar, particularly for a two-wheeler, constructed of at least two metal profile parts which are fixed to one another and overlap on at least a partial area of their length, in which, in a simple and low-cost manner, corrosion is prevented between the two metal profile parts.

This and other objects have been achieved according to the present invention by providing a handlebar for a two-wheeled vehicle, comprising: an interior metal profile; an exterior metal profile arranged around a portion of a longitudinal length of said interior metal profile to define an overlapping area, a gap being defined between said interior and exterior metal profiles at an end of said overlapping area; and an elastic sealing component surrounding said interior and exterior metal profiles at said gap.

This and other objects have been achieved according to the present invention by providing a handlebar for a two-wheeled vehicle, comprising: an interior tubular member having a first length and an outer diameter; an exterior tubular member having a length less than said first length and having an inner diameter greater than said outer diameter, said exterior tubular member being arranged around a portion of said interior tubular member to define an overlapping area, a gap being defined between said interior and exterior tubular members at an end of said overlapping area; and an elastic sealing component surrounding said interior and exterior tubular members at said overlapping area to seal said gap.

This and other objects have been achieved according to the present invention by providing a method of making a handlebar for a two-wheeled vehicle, comprising: providing an interior tubular member having a first length and an outer diameter; providing an exterior tubular member having a length less than said first length and having an inner diameter greater than said outer diameter; sliding said exterior tubular member over said interior tubular member; and arranging an elastic sealing component surrounding said interior and exterior tubular members at an end of said exterior tubular member to seal a gap defined therebetween.

This and other objects have been achieved according to the present invention by providing a method of assembling a handlebar for a two-wheeled vehicle, said handlebar having an interior tubular member with a first length and an outer diameter, and said handlebar having an exterior tubular member with a length less than said first length and having an inner diameter greater than said outer diameter, said method comprising: sliding said exterior tubular member over said interior tubular member; and arranging an elastic sealing component surrounding said interior and exterior tubular members at an end of said exterior tubular member to seal a gap defined therebetween.

This has the advantage that the penetration of moisture between the metal profile parts is reliably prevented at reasonable cost and corrosive conditions are therefore prevented. Tests have shown that such a solution according to the invention for avoiding corrosion, for example, at the gap of two mutually overlapping handle bar tubes of a tube-in-tube handle bar has led to a better result than, for example, a galvanizing at the circumference of the interior tube of the handle bar or a cathodic dip coating of the built-up handle bar.

During tests, the sealing covering of the end of the overlapping area of the two metal profile parts of the handle bar exhibited a surprisingly excellent protection against corrosion, whereas it was found that the cathodic dip coating cannot sufficiently penetrate into the gap and, in the case of a coating in the gap by capillary effect corrosively acting media from the pretreatment remain in the gap which, under certain circumstances, even promote the corrosion.

In an advantageous embodiment of the invention, the additional component is a hose made of a permanently elastic material which surrounds the end of the overlapping area of both metal profile parts and is mounted with one of its two ends respectively on one metal profile part respectively. As an alternative, the additional component may also be a shrink-down hose which surrounds the end of the overlapping area of both metal profile parts and is fastened there in a shrunk-on manner along its whole length or at least with its two ends.

While the type of mounting differs, both of the two above-mentioned embodiments have the advantage that, although the gap between the metal profile parts is closed, relative movements of the metal profiles with respect to one another are possible. Corresponding to the conditions during the mounting, the most advantageous embodiment can then be selected.

According to a preferred embodiment of the invention, the two metal profile parts are fixed to one another via a form closure connection which is created by the deformation of at least one of the metal profile parts in the overlapping area after their assembly.

This has the advantage that the two metal profile parts are form-lockingly connected with one another directly by a deformation operation during the manufacture of the handle bar. In this case, they can be positioned with respect to one another such that the cross-sectional course of the handle bar has a changing section modulus which is designed correspondingly to the forces and/or moments occurring during the operation of the handle bar. Advantageously, the overlapping area of the two metal profile parts can start essentially at a point of the handle bar where, corresponding to the forces and/or moments occurring during the operation of the handle bar, a larger section modulus as the result of a larger cross-section of the handle bar is required, or where the mounting of additional components on the handle bar requires a larger cross-section and/or circumference of the handle bar.

In a preferred embodiment of the invention, for example, an exterior metal profile part may only partially surround an interior metal profile part.

In the course of the handle bar, this advantageously results in at least one progressive ratio of the section modulus. This progressive ratio can be provided at a point, starting from which, during the operation of the handle bar, at least one larger section modulus is required.

According to another preferred embodiment of the invention, the exterior metal profile part surrounds the interior metal profile part at least partially where the mounting of additional components on the handle bar requires a larger cross-section and/or circumference of the handle bar.

As a result, it is advantageously ensured that connections to other components by way of which forces and/or moments are transmitted, can also be constructed to appropriately meet the requirements with respect to stress.

According to another advantageous embodiment of the invention, two concentric tubes, one of which extends inside the other, are used as metal profile parts. This particularly simplifies the manufacturing while the semifinished materials are reasonable in cost. If the outside diameter of the interior tube is selected such that, before the deformation, it is smaller than the inside diameter of the exterior tube, before the deformation, the manufacturing of the handle bar is particularly simple because the interior tube can easily be slid into the exterior tube.

According to another advantageous embodiment, the handle bar, has an essentially symmetrical construction with respect to a two-wheeler center plane, and a center part of the handle bar is constructed of two metal profile parts, particularly two tubes, while two parts of the handle bar situated on the outside are formed by the interior metal profile part, particularly the interior tube.

Such a handle bar construction particularly meets the requirements with respect to stress, as far as the section modulus and the required handle bare cross-section at the center part and at the grip parts are concerned.

In a further preferred embodiment of the invention, the connection of the two metal profile parts can be established in a very simple manner if the center part of the handle bar has at least one bending point.

If at least one layer of an elastomer and/or vibration damping material is inserted between the two metal profile parts, particularly the two tubes, this has the additional advantage that a vibration decoupling takes place at the handle bar. The vibrations of the center part are then transmitted to the grip parts in an advantageously attenuated manner.

Other objects, advantages and novel features of the present invention will become apparent from the following detailed description of the invention when considered in conjunction with the accompanying drawings.

DETAILED DESCRIPTION OF THE DRAWINGS

Both figures contain auxiliary lines which are not required for demonstrating the invention but better show the position of the individual handle bar sections in the space.

Figure 1:
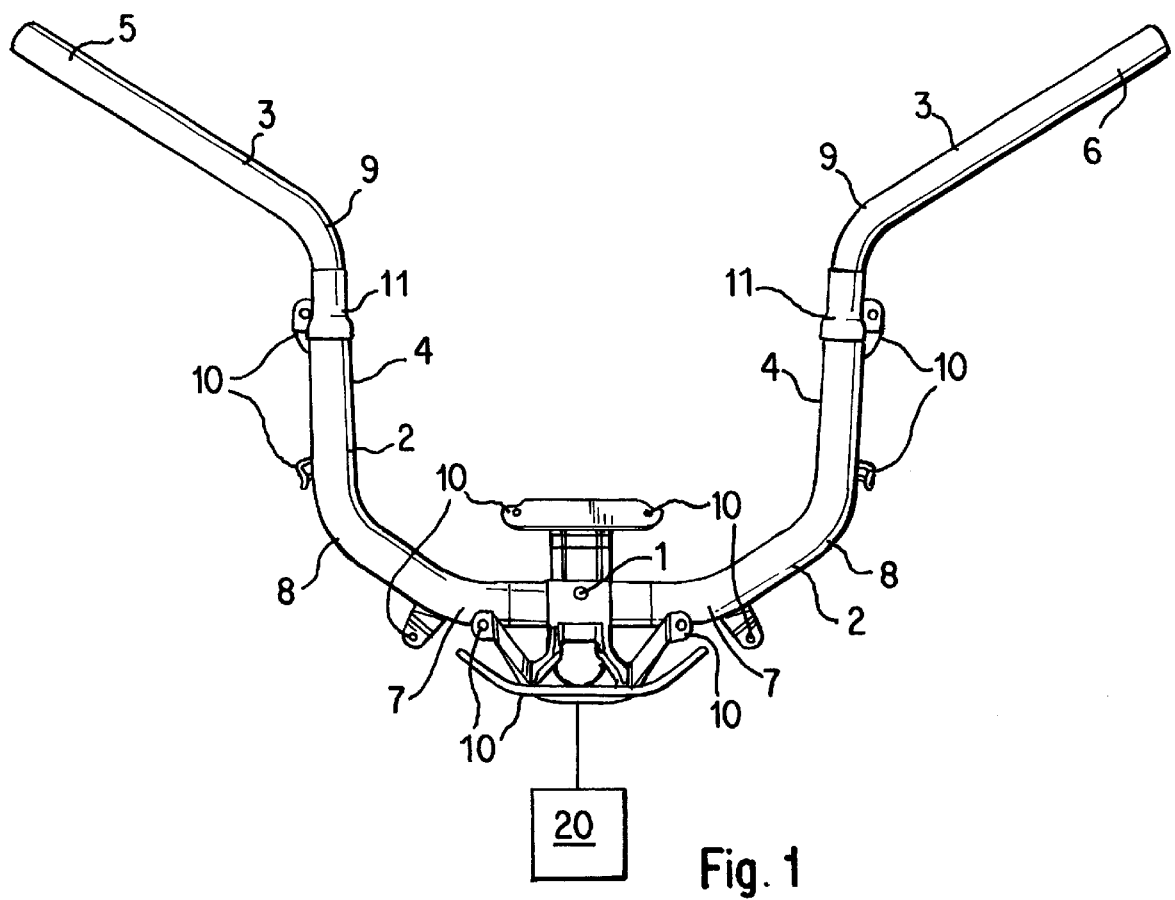
FIG. 1 is a bottom view of a handle bar according to a preferred embodiment of the present invention.
Figure 2:
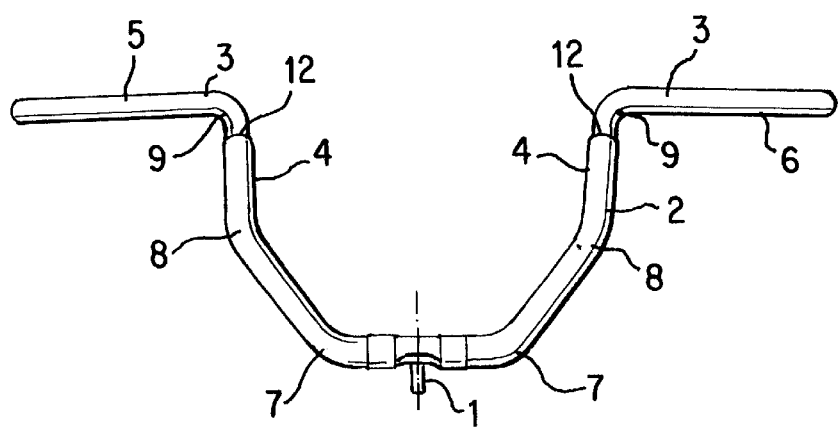
FIG. 2 is a frontal view of a handle bar according to another preferred embodiment of the present invention.

According to FIGS. 1 and 2, a handle bar includes two metal tubes one of which extends inside the other. The handle bar has a symmetrical construction with respect to a center plane of the two-wheeled vehicle 20 upon which it is mounted. The handle bar is mounted on the two-wheeler 20 via a fastening element 1 to be rotatable about a steering axis which is not shown.

Starting from the fastening element 1, the same exterior tube 2 which partially surrounds an interior tube 3 in each case extends to both sides. For this purpose, during the manufacture of the handle bar, the interior tube 3, which has an outside diameter which is smaller than an inside diameter of the exterior tube 2, is led completely through the exterior tube 2, and both tubes 2, 3 are deformed symmetrically with respect to the two-wheeler center plane by bending to form a handle bar. A center part 4 of the handle bar therefore includes both of the tubes 2, 3, while two outer parts of the handle bar, comprising grip pieces 5, 6, consist only of the interior tube 3.

The center part 4 of the handle bar has a larger section modulus and a larger diameter than the grip pieces 5, 6. Starting from the two-wheeler center plane, the handle bar is deformed such that three bending points 7, 8, 9 are created toward each side. The bending points 7 and 8 represent the form closure connection between the interior tube 3 and the exterior tube 2. As the result, the two tubes 2, 3 are non-displaceably connected with one another. The bending point 9 forms the transition from the center part 4 to the grip pieces 5, 6 outside the exterior tube 2, for the purpose of which only the interior tube 3 is deformed.

The interior tube 3 has an outside diameter which is suitable for ensuring an ergonomically ideal gripping around the handle bar, for example, by means of a handle which is mounted on the handle bar and is not shown.

Along the whole range of its length, the exterior tube 2 overlaps the interior tube 3. On the ends of the overlapping area of the tubes 2 and 3, which in this embodiment also correspond to the ends of the exterior tube 2, the two tubes 2, 3 are in each case covered by a shrink-down hose 11 which surrounds the end of their overlapping area in a permanently elastically sealing manner and is fastened there along its whole length in a shrunk-on fashion. The shrink-down hoses 11 seal off the circumferential gaps, which are not visible in FIG. 1, but shown by way of reference numeral 21 in FIG. 3, between the two tubes 2, 3 and thus prevent moisture from penetrating into the gap area.

In the overlapping area of the two tubes 2, 3, the bending points 7, 8 are situated which, as the form closure connection, ensure that the two tubes 2, 3 are fixed on one another. The overlapping area of the two tubes 2, 3 starts essentially at a point of the handle bar, starting from which, during the operation of the handle bar, the occurring forces and/or moments require a higher section modulus of the handle bar and where the mounting of additional components 10 on the handle bar requires a larger cross-section and/or circumference of the handle bar.

FIG. 2 shows a handle bar without the shrink-down hoses 11 shown in FIG. 1. The contour lines 12 at the ends of the exterior tube 2 show the gaps between the two tubes 2, 3 which are to be sealed off by the shrink-down hoses 11, which are shrunk on at the end of the overlapping area of the two tubes 2, 3 along their outer circumference, as shown in FIG. 1.

Figure 3:
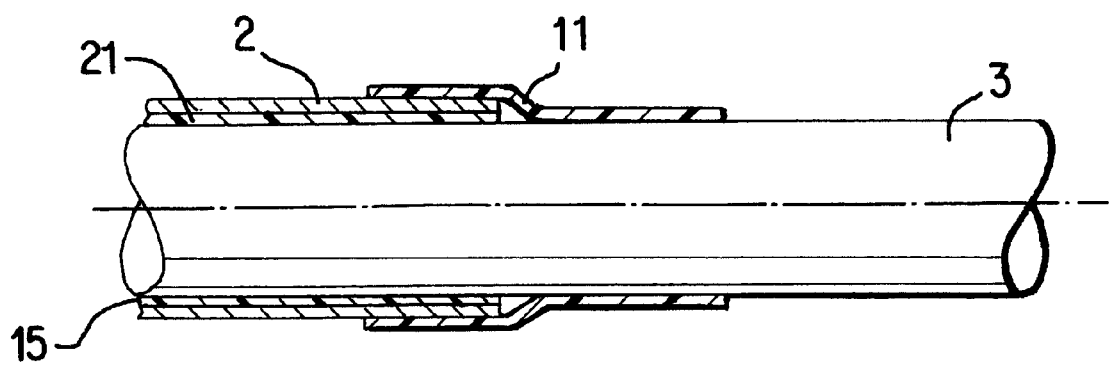
FIG. 3 is an enhanced partial sectional view depicting a portion of the handle bar having a vibration elastomer layer interposed between the metal profile tubes, according to certain preferred embodiments of the invention.

FIG. 3 is an enlarged sectional view depicting an elastomer layer 15 between the metal profiles 2 and 3. This layer 15 serves to attenuate vibrations transmitted from the center part to the grip parts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Handlebar for a two-wheeled vehicle, comprising:
   an interior metal profile;
   an exterior metal profile arranged around a portion of a longitudinal length of said interior metal profile to define an overlapping area, a gap being defined between said interior and exterior metal profiles at an end of said overlapping area; and
   an elastic sealing component surrounding outer surfaces of said interior and exterior metal profiles at said gap.

2. Handlebar according to claim 1, wherein said sealing component is a hose which is made of a permanently elastic material, one portion of said hose engaging said interior metal profile adjacent said gap, and another portion of said hose engaging said exterior metal profile adjacent said gap.

3. Handlebar according to claim 1, wherein said sealing component is a shrink-down hose shrunk onto said interior and exterior metal profiles at said gap.

4. Handlebar according to claim 1, wherein said interior and exterior metal profile s are fixed via a form closure connection made by deforming at least one of the metal profiles in the overlapping area.

5. Handlebar according to claim 1, wherein the overlapping area of the two metal profiles is arranged at a location of the handlebar which is to receive higher forces during operation.

6. Handlebar according to claim 1, wherein the overlapping area of the two metal profiles is arranged at a location of the handlebar which is to receive additional components.

7. Handlebar according to claim 1, wherein the metal profiles are concentric tubes.

8. Handlebar according to claim 7, wherein the outside diameter of the interior tube prior to deformation is smaller than the inside diameter of the exterior tube.

9. Handlebar according to claim 1, wherein the handlebar has a symmetrical construction with respect to a center plane thereof, said overlapping area forming a center part of the handlebar, longitudinal ends of the interior metal profile extending from ends of the interior metal profile extending from ends of the exterior metal profile, respectively, to define gripping areas.

10. Handlebar according to claim 9, wherein the center part of the handlebar has at least one bending point.

11. Handlebar according to claim 1, further comprising a layer of at least one of an elastomer and a vibration-damping material located between the two metal profiles.

12. A handlebar for a two-wheeled vehicle, comprising:
    an interior tubular member having a first length and an outer diameter;
    an exterior tubular member having a length less than said first length and having an inner diameter greater than said outer diameter, said exterior tubular member being arranged around a portion of said interior tubular member to define an overlapping area, a gap being defined between said interior and exterior tubular members at an end of said overlapping area; and
    an elastic sealing component surrounding outer surfaces of said interior and exterior tubular members at said overlapping area to seal said gap.

13. A handlebar according to claim 12, wherein said elastic sealing component is a shrink-down hose shrunk onto said interior and exterior tubular members at said gap.

14. A handlebar according to claim 12, wherein said first and second tubular members define at least one bending point in said overlapping area forming a locking connection.

15. A handlebar for a two-wheeled vehicle, comprising:
    an interior metal profile;
    an exterior metal profile arranged around a portion of a longitudinal length of said interior metal profile to define an overlapping area, a gap being defined between said interior and exterior metal profiles at an end of said overlapping area;
    an elastic sealing component surrounding outer surfaces of said interior and exterior metal profiles at said gap; and
    a layer of at least one of an elastomer and a vibration-damping material located between the two metal profiles.

* * * * *